C. G. FISHER.
HIGHWAY DANGER SIGNAL.
APPLICATION FILED FEB. 24, 1916.
1,360,203.
Patented Nov. 23, 1920.
2 SHEETS—SHEET 1.
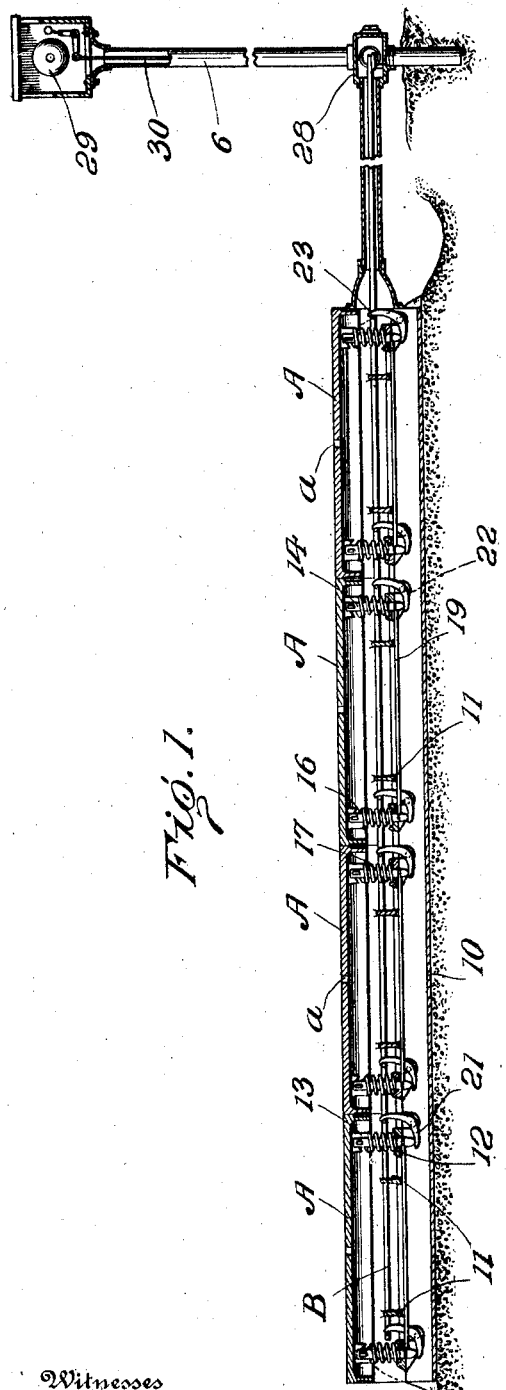
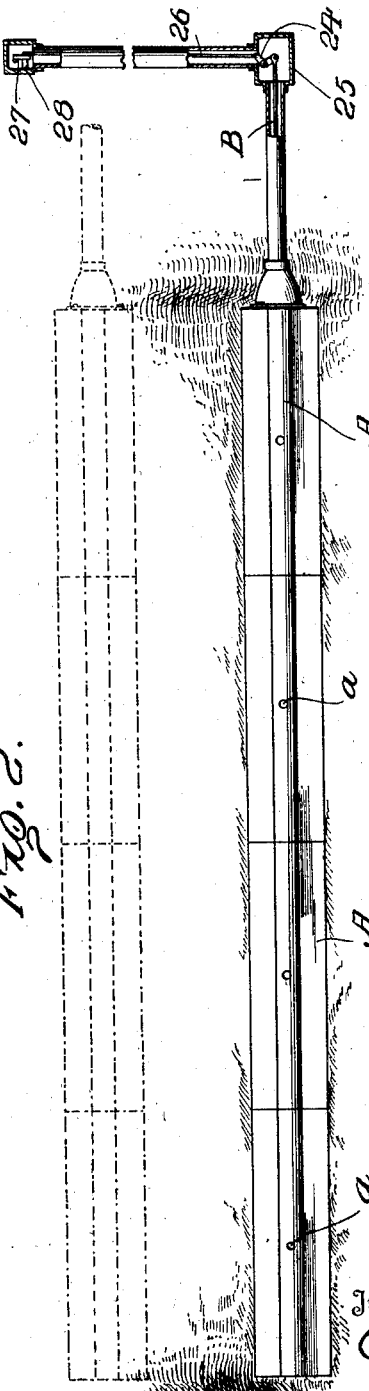

C. G. FISHER.
HIGHWAY DANGER SIGNAL.
APPLICATION FILED FEB. 24, 1916.
1,360,203.
Patented Nov. 23, 1920.
2 SHEETS—SHEET 2.
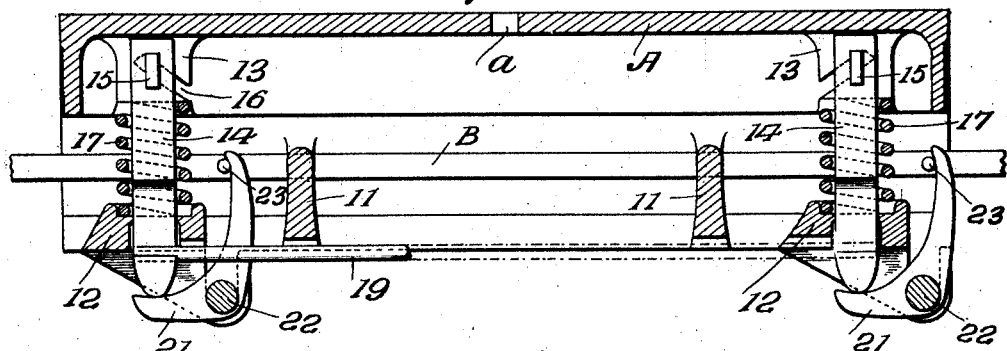
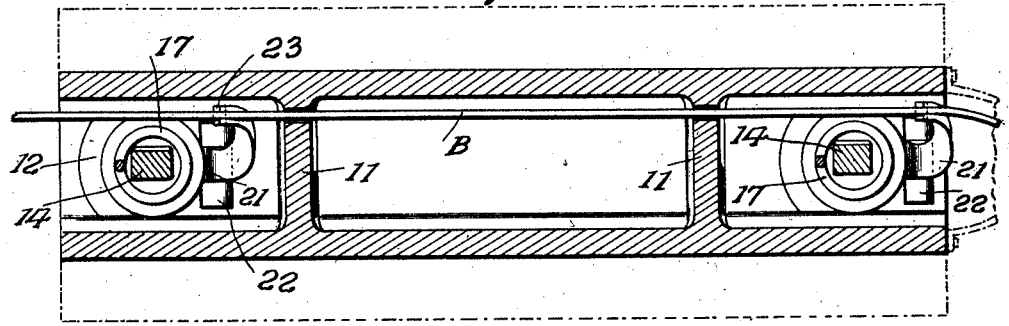
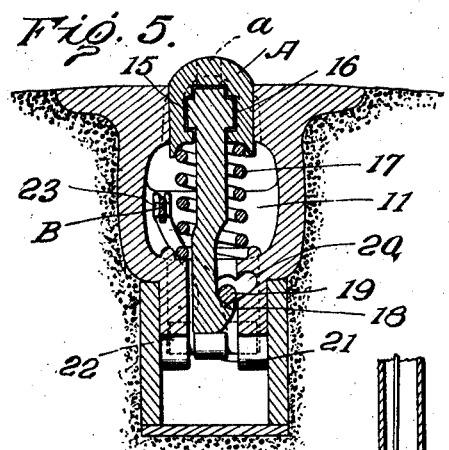
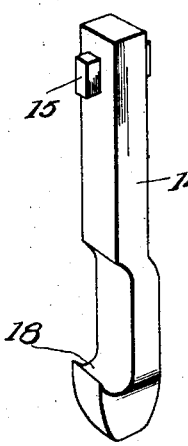
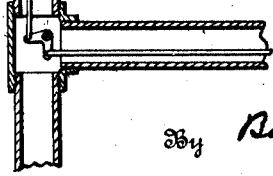

UNITED STATES PATENT OFFICE.

CARL G. FISHER, OF INDIANAPOLIS, INDIANA, ASSIGNOR TO THE PREST-O-LITE COMPANY, OF INDIANAPOLIS, INDIANA, A CORPORATION OF NEW YORK.

HIGHWAY DANGER-SIGNAL.

1,360,203.          Specification of Letters Patent.     Patented Nov. 23, 1920.

Application filed February 24, 1916. Serial No. 80,289.

*To all whom it may concern:*

Be it known that I, CARL G. FISHER, a citizen of the United States, residing at Indianapolis, Marion county, and State of Indiana, have invented and discovered certain new and useful Improvements in Highway Danger-Signals, of which the following is a specification.

The purpose of my said invention is to provide a highway safety signal designed to warn the driver of a vehicle, whether motor propelled or otherwise, of the approach to a railway crossing, or other place of danger, so that the driver will be warned a sufficient distance in advance of reaching said place to guard against accident from approaching trains on the railway tracks, or danger from other causes, and thus guard against the numerous serious, and ofttimes fatal, accidents resulting from crossing railway tracks and entering other danger zones that are not conspicuously noticeable or possibly adequately marked or guarded.

In carrying out this purpose, I provide an apparatus designed to be located in the roadway of the highway at a distance from such danger zone, and constructed to be operated by the passing of a vehicle to operate a warning signal and announce to the driver that he is approaching danger and put him on guard against possible accident.

Referring to the accompanying drawings, which are made a part hereof, and on which similar reference characters indicate similar parts:

Figure 1 is a sectional view across the roadway and through the operating mechanism of my apparatus, illustrating the connections with the signal and manner of operation, Fig. 2 a top or plan view with certain portions shown in section, Fig. 3 a detail view on an enlarged scale, similar to a portion of Fig. 1, Fig. 4 a horizontal sectional view of said portion, Fig. 5 a transverse sectional view thereof, Fig. 6 a detail view of one of the parts, and Fig. 7 a detail section on an enlarged scale, similar to a portion of Fig. 2.

In said drawings, the portions marked A represent the operating members set in the roadway, B a connecting rod, and C the signal stand.

In the construction of the apparatus a housing is embedded across the roadway, consisting of an appropriate casing 10, preferably of metal, in which the trip members A are mounted. Said casing is provided with appropriate cross members 11 and other cross members 12, which serve to strengthen the casing and support the operative parts.

Each member A is formed with depending sockets, or flanges, 13 near each end on its underside, to which depending bars 14 are attached by pins (or lugs) 15 extending from opposite sides near the top of each bar and adapted to engage with slots 16 in the sides of said socket. Said slots 16 are preferably formed, as shown, to extend through to one side of the sockets 13, terminating at their inner ends in vertical portions adapted to receive and retain the rectangular pins 15, and maintain the bars 14 in practically rigid vertical relation with the members A, but permit their ready and convenient engagement or separation. A coiled spring 17 is interposed between the lower end of each socket 13 and a seat formed in the top face of each cross-member 12. These several springs serve to support the members A in normal position. Each bar 14 extends through a perforation in the member 12, which perforation serves as a guide therefor, and near its lower end, is formed with a hook 18 adapted to engage under a lock-rod 19 which is mounted in perforations in the cross members 12, and thus serves to limit the upward movement of the bars 14 and members A, retaining said members A in normal position against the force of the springs 17. The perforations in which said bars 19 are mounted, are formed with side recessed portions 20, into which the bar may be forced by means of a pointed rod forced downward through an aperture *a* in each member A. This serves to unlock the connections and permit the sections A, with their depending bars 14, to be lifted out of the housing for the purpose of cleaning or repair. The bar 19, when released, normally falls to the bottom of the slot, which is inclined, and, when the bars 14 are forced into operative position, their tapered lower ends push the rod over into the recesses to allow the hooks 18 to pass, after which it automatically falls over said hooks and, on vertical reciprocation of said bars, contacts with the upper faces of the perforations and serves to lock the parts in normal position.

An angle or bell-crank lever 21 is mounted on a pivot 22 between side flanges adjacent to the cross member 12, the horizontal arm of which contacts with the lower end of the push bar 12, and the other or vertical arm of which contacts with a pin 23 on the connecting rod B. Each of the sections A is thus connected at each end to operate the connecting rod B. Said rod extends entirely across the roadway, or from end to end of the trap, and the trap is of sufficient length so that at least one wheel of any vehicle passing must pass over one of said sections, thus insuring the reciprocation of said connecting rod.

Said connecting rod B is pivotally connected to one end of a bell-crank lever 24, in the casing 25, alongside the highway, the other end of said bell-crank lever being connected to another rod 26 which is connected to the end of another bell-crank lever 27 in another casing 28 at a distance toward the railway track, or danger zone, from the trap. The casing 28 is the bottom of the signal stand C, on the upper part of which is mounted a signal 29 of any appropriate character or design. This signal is operated from the bell-crank lever 27, through a connecting rod 30.

The construction illustrated includes connections from the casing 10 to the signal stand, these connections consisting in main of ordinary angles and appropriate iron pipe connections, or may be of any other construction found suitable.

While the signal illustrated is a bell signal, it will be understood, of course, that signals of other types, or of any preferred type found appropriate, may be used.

In use the top of sections A will be arranged slightly above the normal surface of the roadway, as indicated in Fig. 5, and approaches on either side will be constructed of appropriate form.

It will also be understood that this device may be located wherever needed to give warning of approach to a danger zone, and may be duplicated as frequently as required to secure the best results in use. For example, in the case of a double-track railroad, it may be found advisable to locate two signals a short distance apart, as indicated by dotted lines in Fig. 2, so that the driver, in approaching the railroad track, will get two warnings instead of one, and thus understand that he is approaching a double-track road and not attempt to pass over the track immediately following the passing of one train in one direction, but wait to make sure that another train is not approaching in the other direction on the other track. The signal should be so located that it will sound in front of the driver, and not after he has passed, to insure that it will be heard.

Having thus fully described my said invention, what I claim as new and desire to secure by Letters Patent, is:

1. In a highway danger signaling apparatus the combination, of a housing embodied across the roadway, a spring supported vertically movable member mounted in said housing and having bars depending therefrom, bell crank levers mounted in the housing and connecting through said depending bars with said depressible member, a reciprocable rod passing through the housing and engaging with the bell crank levers to be actuated thereby, and a signal device to be operated by said rod, substantially as set forth.

2. In a highway danger signaling apparatus the combination of a housing having a pair of perforated cross-bars, a depressible member mounted in the trap and having depending bars passing through said perforations, springs fitted on said bars supporting and normally keeping the depressible member in operative position, a pair of bell-crank levers mounted in the housing and engaged to be operated by said depending bars, a reciprocable rod passing through the housing and engaging with the bell-crank levers to be actuated thereby, and a signal device connected to be operated by said rod, substantially as set forth.

3. In a highway danger signaling apparatus the combination of a housing, a depressible member mounted in the housing and having depending bars constructed with hooked portions, springs fitted on said depending bars and normally keeping the depressible member in operative position, a rod engaging the hooked portions in said bars and holding the depressible member against displacement from the housing, means mounted in the housing engaging said depending bars and adapted to be actuated thereby, and a signaling device connected to be operated by said means, substantially as set forth.

In witness whereof I have hereunto set my hand and seal at Miami, Florida, this 12th day of February, A. D. nineteen hundred and sixteen.

CARL G. FISHER. [L. S.]

Witnesses:
   A. A. Rossiter,
   Will J. Dobyns.